United States Patent [19]

Berfield et al.

[11] Patent Number: 4,623,366
[45] Date of Patent: Nov. 18, 1986

[54] GRID ELEMENT FOR LID OF A CANNISTER TYPE VACUUM CLEANER

[75] Inventors: Robert C. Berfield, Jersey Shore; Rudolph W. Wacek, Montoursville; Craig Seasholtz, Avis, all of Pa.

[73] Assignee: Shop-Vac Corporation, Williamsport, Pa.

[21] Appl. No.: 778,430

[22] Filed: Sep. 20, 1985

[51] Int. Cl.⁴ ............................................. B01D 46/00
[52] U.S. Cl. ..................................... 55/216; 55/309; 55/471; 55/472
[58] Field of Search ................. 55/216, 219, 309, 467, 55/471, 472; 137/202, 205; 210/119, 123

[56] References Cited

U.S. PATENT DOCUMENTS

| | | | |
|---|---|---|---|
| 1,469,790 | 10/1923 | Hysko | 210/119 X |
| 2,388,481 | 11/1945 | Green | 137/202 |
| 2,649,927 | 8/1953 | Ortega | 55/216 |
| 3,045,412 | 7/1962 | Bowman | 55/471 X |
| 3,220,638 | 11/1965 | Petersen | 55/471 X |
| 3,290,865 | 12/1966 | Serou et al. | 55/216 |
| 3,296,777 | 1/1967 | Jackson et al. | 55/472 X |
| 3,909,219 | 9/1975 | Fromknecht | 55/216 |
| 4,057,364 | 11/1977 | Bratschitsch | 137/205 X |
| 4,185,974 | 1/1980 | Hiester | 55/472 X |
| 4,508,550 | 4/1985 | Berfield et al. | 137/202 X |

FOREIGN PATENT DOCUMENTS 665265  6/1963  Canada ................................. 55/216

Primary Examiner—Robert Spitzer
Attorney, Agent, or Firm—Ostrolenk, Faber, Gerb & Soffen

[57] ABSTRACT

A wet/dry cannister-type vacuum cleaner is provided with a plastic grid unit that includes a spherical cup-like main section, an upper annular mounting lip, a short tubular support disposed within the main section with the lower end of the support surrounding a central inlet opening in the latter, and a grid extending across the support at the top thereof and disposed below the mounting lip. The lower end of the support constitutes a seat for a floating ball valve element. An axially extending slot in the support provides a drain for liquid that may be accumulated by the main section at the interior thereof.

18 Claims, 4 Drawing Figures

GRID ELEMENT FOR LID OF A CANNISTER TYPE VACUUM CLEANER

BACKGROUND OF THE INVENTION

The present invention relates to the lid and filter cage for a so-called wet/dry cannister or tank type vacuum cleaner, and is an improvement of the grid element construction disclosed in U.S. Pat. No. 4,185,974, issued Jan. 29, 1980 to K. R. Hiester for An Integral Filter Cage and Lid For Cannister Type Vacuum Cleaner.

Cannister or tank type vacuum cleaners are used for collecting various types of material, both dry and wet, and they are sometimes even used for collecting water or other liquids. In a typical vacuum cleaner of this type, the vacuum cleaner motor is supported on the removable lid for the dirt collecting tank and drives an impeller fan having an inlet side that communicates with the tank interior and draws a vacuum therein.

In the usual cannister vacuum cleaner, the lid is a generally flat surface disc or plate. To provide the lid with the strength needed for supporting the motor, especially while it is in operation, and for supporting an air filter assembly, the lid is typically formed of a strong, relatively rigid metal disc having a periphery that is shaped to sealingly engage the upper end of the side wall of the cylindrical tank. A hole is cut through the lid just beneath the mounting for the motor and this hole provides communication between the interior of the tank and the impeller fan driven by the motor.

A filter assembly is interposed between the interior of the tank and the inlet to the impeller fan for capturing particulate matter so that it does not escape into and past the fan and is not expelled from the vacuum cleaner. In the typical tank vacuum cleaner, directly beneath the lid of the tank and at the inlet to the impeller fan, there is a support for a replaceable filter element. Typically, the filter support is in the form of a generally cylindrical cage, and the filter element is in the form of a cylindrical annulus or sleeve of open cell foam material which is removably fitted over the filter cage. The annular sides of the filter cage are defined by vertical ribs, shaped and placed to support the surrounding filter element, yet spaced apart so as not to interfere with air flow. The bottom of the filter cage is closed off.

In situations where liquid or wet materials are being collected, it is necessary that the flow out of the tank and into the vacuum cleaner motor be halted before the liquid or wet material is drawn into the motor.

For supporting the particulate material filter element, the filter cage of the typical cannister vacuum cleaner is secured to the underside of the lid around the hole through the lid, and the filter cage is a molded plastic unit with an annular collar at its upper edge. Inside the filter cage, there is a ball or cylinder float element that sits on the base of the filter cage and is adapted to float up within the filter cage once the level of liquid in the tank rises above the bottom of the filter cage. The float element eventually floats high enough to seal the inlet to the impeller fan. Further operation of the vacuum cleaner is blocked until the tank is emptied of collected material. At the same time, the filter element may also be replaced.

As shown in the aforesaid U.S. Pat. No. 4,185,974, the bottom end of the filter cage is closed off by a bottom cover. An inlet grid element, including a grid covered opening, is disposed across the hole through the tank lid for permitting air to pass through the hole in the lid while also enclosing the top end of the filter cage as a safety feature to block access to the rotating impeller fan. A generally flat wall extends from the grid to the tank lid. The bottom edge of a sleeve extending downward from the grid constitutes a seat against which the float seals upon rising to a predetermined level.

If the fan continues to operate after its inlet is blocked by sealing of the float against the seat, the fan motor overheats. This causes the molded plastic grid unit to overheat at a time when there is an upward force transmitted through the float to the sleeve portion of the grid unit. As a result, the grid unit distorts, often resulting in a faulty sealing between the float and seat at the bottom edge of the sleeve.

SUMMARY OF THE INVENTION

In order to overcome the foregoing problem of the prior art, the instant invention provides a plastic grid unit construction that includes a protective grid disposed substantially below the tank lid and a cup-shaped wall that extends upward from the bottom sealing edge of the grid unit sleeve to the tank lid. With this construction, distortion of the grid is less likely to occur because overheating of the grid unit will be reduced and the cup-shaped wall provides increased resistance to distortion as compared to the generally flat wall of the prior art.

Accordingly, the primary object of this invention is to provide an improved construction for a wet/dry by-pass type vacuum cleaner.

Another object is to provide a vacuum cleaner of this type that is better able to resist damage when subjected to overheating that results from fan motor operation while the fan inlet is blocked.

Still another object is to provide a vacuum cleaner of this type having an improved plastic grid unit that is interposed between the fan inlet and the tank interior.

A further object is to provide a vacuum cleaner of this type having an improved grid unit that includes a cup-shaped wall that extends downward from the tank lid to the ball valve seating surface at the bottom of a sleeve having a protective grid at the top thereof.

BRIEF DESCRIPTION OF THE DRAWINGS

These objects as well as other objects of this invention shall become readily apparent after reading the following description of the accompanying drawings in which.

DETAILED DESCRIPTION OF THE DRAWINGS

Figure 4:
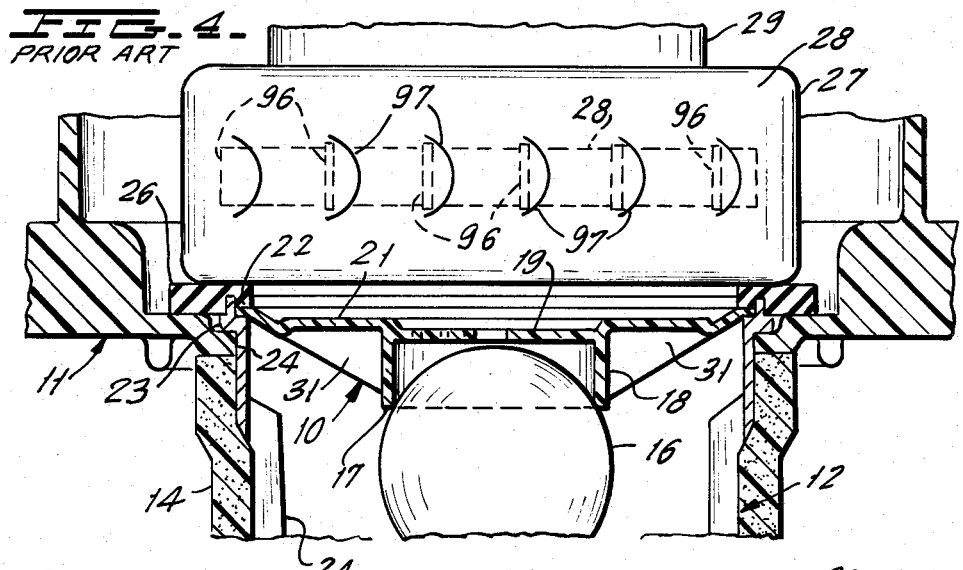
FIG. 4 is a fragmentary vertical cross-section of a prior art wet/dry vacuum cleaner of the type illustrated in the aforesaid U.S. Pat. No. 4,185,974.

Now referring to the drawings and more particularly to FIG. 4 which illustrates that portion of a prior art wet/dry vacuum having a plastic grid unit 10 which is part of a subassembly that includes lid 11 and plastic filter cage 12. Lid 11 is removably seated on outwardly turned circular bead 54 (FIG. 1) formed along the periphery at the open top of matter accumulating cannister or tank 51 having closed bottom 56.

Cage 12 is surrounded by filter sleeve 14 and includes a plurality of spaced vertically extending arcuate sections 24 that form a vertical guide for ball float 16. The latter constitutes an automatic valve movable upward against annular seating surface 17 formed by the inner edge at the bottom of shallow tube 18 having grid 19 formed across the upper end thereof. Generally horizontal support 21 extends outwardly from the upper end of tube 18 and terminates in annular lip 22 that constitutes a mounting portion. A plurality of stiffening ribs 31 extend from the outer surface of tube 18 to the lower surface of horizontal wall 21. Grid unit 10 extends across the upper end of filter cage 12 with lip 22 seated on a ledge provided by annulus 23 that connects the upper ends of bars 24 that define the side of cage 12. Annulus 23 is seated on the upper surface of lid 11 at the portion thereof defining circular aperture 24.

The lower surface of ring-like pad 26 rests against lip 22, rim 23 and lid 11. The lower surface of metal housing 27 rests against the upper surface of pad 26. Centrifugal fan impeller 28 is disposed within housing 27 and is rotated by electric motor 29 that is disposed above housing 27. The latter is relatively shallow with the circular side wall thereof being provided with a plurality of exhaust apertures 96 each associated with a louver 97 which directs air flow created by rotation of impeller 28 as such air flow is directed out of housing 27. Centered in the bottom wall of housing 27 is a circular aperture (not shown) approximately the size of cage 19, such aperture providing an inlet through which air flows to the center of impeller 28.

When the vacuum utilizing the elements of FIG. 4 has accumulated a sufficient amount of water so that float 16 rises and seals against seat 17, the fan inlet opening at the bottom of housing 27 is blocked so that even if motor 29 continues to operate there will no longer be a flow of air and in short order motor 29 will generate excessive heat that will cause grid unit 10 to distort. That is, when grid unit 10 heats excessively it will distort because of upward force exerted thereon by ball float 16. Further, when motor 29 is turned off and ball 16 recedes, cooling of grid unit 10 will be uncontrolled so that cooling will not take place uniformly, thereby resulting in distortions. These distortions make it likely that during subsequent operation, mating of ball float 16 with seat 17 will be less than perfect so that water may be drawn through fan 28 and overflow the accumulating tank of the vacuum and/or damage the fan.

Figure 1:
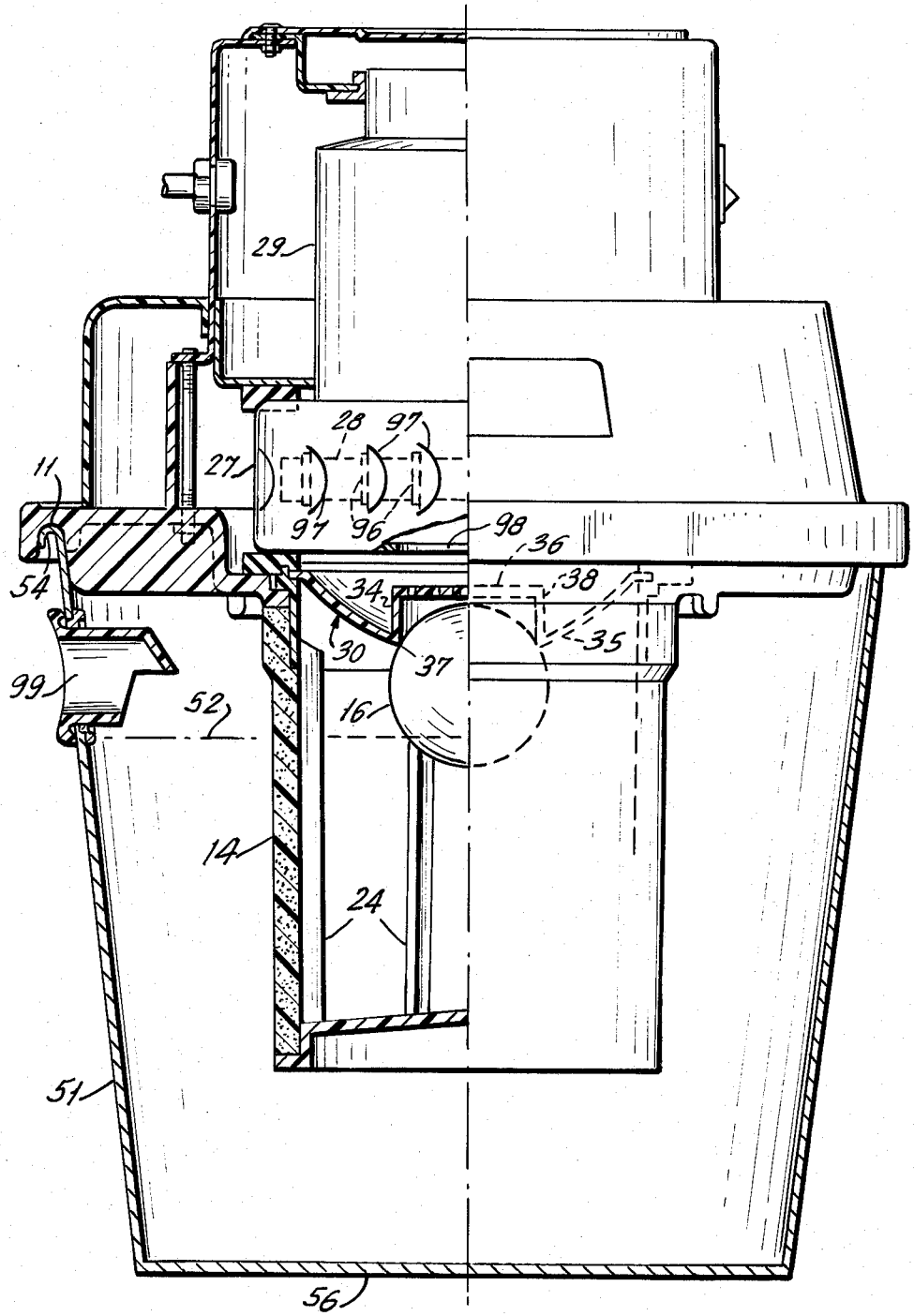
FIG. 1 is a side elevation, partially sectioned, of a wet/dry vacuum cleaner having a plastic grid unit constructed in accordance with teachings of the instant invention.
Figure 3:
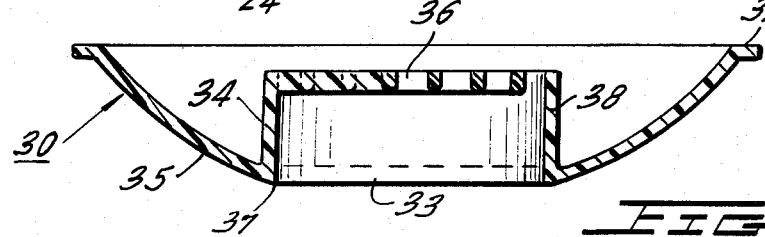
FIG. 3 is a cross-section taken through line 3—3 of FIG. 2 looking in the direction of arrows 3—3.
Figure 2:
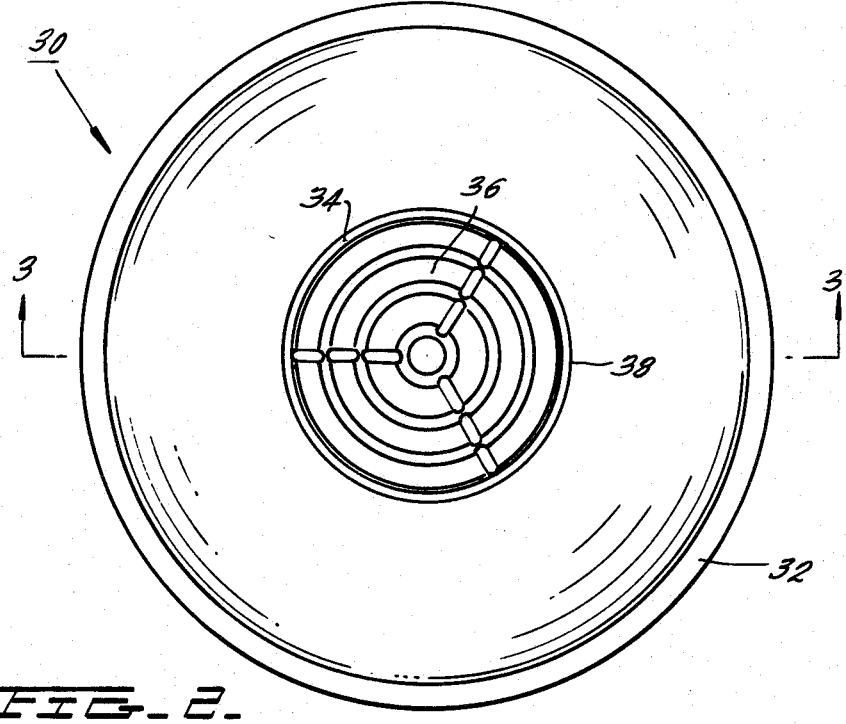
FIG. 2 is a plan view of the grid unit.

To avoid the foregoing condition, plastic grid unit 10 is replaced by plastic grid unit 30 which is constructed in accordance with teachings of the instant invention and is illustrated in FIGS. 1–3. More particularly, member 30 includes cup-like spherical main section 35 and annular outwardly projecting lip 32 constituting a mounting section formed along the periphery thereof. Inlet aperture 33 is disposed at the center of main section 35 and is surrounded by upwardly extending sleeve-like support 34 that is disposed within main section 35. Grid 36 partially closes the upper end of support 34. The lower inner annular edge 37 of sleeve 34 constitutes a valve seat against which ball 16 is forced when water within tank 51 reaches predetermined level 52 somewhat below seat 37 and tank inlet 99. When ball 16 is engaged with seat 37, the passage for movement of air from tank 51 through fan inlet 98 the bottom of housing 27 is blocked so that additional material cannot be drawn into tank 51.

Longitudinal slot 38 is support 34 extends upwardly from the inner surface of main section 35 and constitutes a drain for water that may have accumulted within main section 35. That is, as ball float 16 travels upward to seal against seat 37, ball 16 is wet and in some instances a spray may travel upward before ball 16 reaches seat 17 so that a slight pool of liquid may accumulate within main section 35 after ball 16 reaches seat 17. After ball 16 moves downward and separates from seat 17, water within main section 35 will drain through slot 38 and inlet aperture 33 into tank 51 so that when motor 29 is restarted there is no danger that water which had accumulated within main section 35 will be sucked into the fan mechanism or sprayed out the side of fan housing 27.

By utilizing a spherical main section 35, the overall structure supporting grid 36 is strengthened so that valve seat 37 is less likely to be distorted and/or displaced as the result of heat generated by operation of motor 29 after ball 16 seals against seat 37. This strengthening is achieved without the necessity of including ribs 31 which merely provide support for the valve seat 37 at spaced points thereof. The spacing between the elements constituting grid 36 are close enough to prevent fingers from being inserted into fan housing 27 to engage impeller 28. Grid 36 is positioned substantially below mounting lip 32, hence a substantial distance from fan housing 27 so that there will be less heat transferred from motor 29 through fan housing 27 to grid 36.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A wet/dry vacuum cleaner including:
   an accumulating tank having a closed bottom and an open top, and a removably assembly for closing that open top;
   said assembly including suction blower means for generating a stream of working air that extends through said tank, said blower having an inlet opening through which said stream flows, and automatic valve means disposed downstream of said opening to prevent liquid that is picked up by said cleaner and accumulated in said tank from rising to said opening;
   said valve means including a float and a member defining an annular seat against which said float seals from below when water in said tank reaches a predetermined level below said opening;
   said member including a mounting portion, and a main portion having an aperture where said seat is disposed; and
   said main portion including a wall that slopes inwardly and downwardly from said mounting portion to said aperture whereby the latter is disposed substantially below said inlet opening of said blower means.

2. A wet/dry vacuum as set forth in claim 1, in which the main portion is defined by an arcuate generatrix.

3. A wet/dry vacuum as set forth in claim 2, in which the mounting portion includes an annular lip that extends outwardly from said main portion.

4. A wet/dry vacuum as set forth in claim 1, in which the main portion is concave when said member is viewed from above.

5. A wet/dry vacuum as set forth in claim 4, in which the main portion is defined by an arcuate generatrix that is essentially of uniform radius.

6. A wet/dry vacuum as set forth in claim 1, in which the member also includes a grid disposed above said aperture and a sleeve-like support extending downward from said grid to said main portion.

7. A wet/dry vacuum as set forth in claim 6, in which there is a drain means in said support disposed in the vicinity of said main portion.

8. A wet/dry vacuum as set forth in claim 7, in which the drain means includes a longitudinally extending slot in said support.

9. A wet/dry vacuum as set forth in claim 6, in which the grid is at a level below that of the mounting portion.

10. A wet/dry vacuum as set forth in claim 1, also including a filter in said stream upstream of said valve means;
    a cage that supports said filter; and
    guide means disposed within said cage for directing said float toward said seat.

11. A wet/dry vacuum as set forth in claim 10, in which the main portion is defined by an arcuate generatrix.

12. A wet/dry vacuum as set forth in claim 11, in which the main portion is concave when said member is viewed from above.

13. A wet/dry vacuum as set forth in claim 12, in which the arcuate generatrix is essentially of uniform radius.

14. A wet/dry vacuum as set forth in claim 13, in which the mounting portion includes an annular lip that extends outwardly from said main portion.

15. A wet/dry vacuum as set forth in claim 11, in which the member also includes a grid disposed above said aperture and a sleeve-like support extending downward from said grid to said main portion.

16. A wet/dry vacuum as set forth in claim 15, in which the grid is at a level below that of the mounting portion.

17. A wet/dry vacuum as set forth in claim 16, in which there is a drain means in said support disposed in the vicinity of said main portion.

18. A wet/dry vacuum as set forth in claim 17, in which the drain means includes a longitudinally extending slot in said support.

* * * * *

UNITED STATES PATENT AND TRADEMARK OFFICE
CERTIFICATE OF CORRECTION

PATENT NO. : 4,623,366

DATED : November 18, 1986

INVENTOR(S) : Robert C. Berfield et al.

It is certified that error appears in the above-identified patent and that said Letters Patent is hereby corrected as shown below:

Column 4, line 48, change "downstream" to --upstream--.

Signed and Sealed this

Third Day of October, 1989

Attest:

DONALD J. QUIGG

Attesting Officer

Commissioner of Patents and Trademarks